United States Patent [19]
Howard

[11] 3,994,510
[45] Nov. 30, 1976

[54] TRAILER COUPLING MEANS

[76] Inventor: Durrell U. Howard, c/o The Dee Howard Company, P.O. Box 16216, International Airport, San Antonio, Tex. 78216

[22] Filed: July 17, 1974

[21] Appl. No.: 489,217

Related U.S. Application Data

[62] Division of Ser. No. 198,378, Nov. 12, 1971, Pat. No. 3,825,281.

[52] U.S. Cl. .............................. 280/432; 280/474
[51] Int. Cl.² ........................................ B62D 53/08
[58] Field of Search ............. 280/433, 432, 423 R, 280/438 R, 438 A, 446 B, 474

[56] References Cited
UNITED STATES PATENTS

| | | | |
|---|---|---|---|
| 1,933,622 | 11/1933 | Fellows | 280/438 R X |
| 3,091,501 | 5/1963 | Satrum | 280/433 X |
| 3,690,699 | 9/1972 | Derr | 280/433 X |

FOREIGN PATENTS OR APPLICATIONS

| | | | |
|---|---|---|---|
| 486,833 | 2/1918 | France | 280/433 |

Primary Examiner—M. H. Wood, Jr.
Assistant Examiner—John A. Pekar
Attorney, Agent, or Firm—Pollock, Vande Sande & Priddy

[57] ABSTRACT

The disclosure relates to a means of coupling a trailer to an automobile comprising a self-aligning and shock-absorbing coupling means. The coupling means uses a fifth wheel and spring-loaded roller-detent means to maintain alignment in yaw between the vehicle and the trailer. A speed-responsive means reduces the "stiffness" in yaw between the automobile and the trailer when the vehicle speed is below a predetermined value.

6 Claims, 4 Drawing Figures

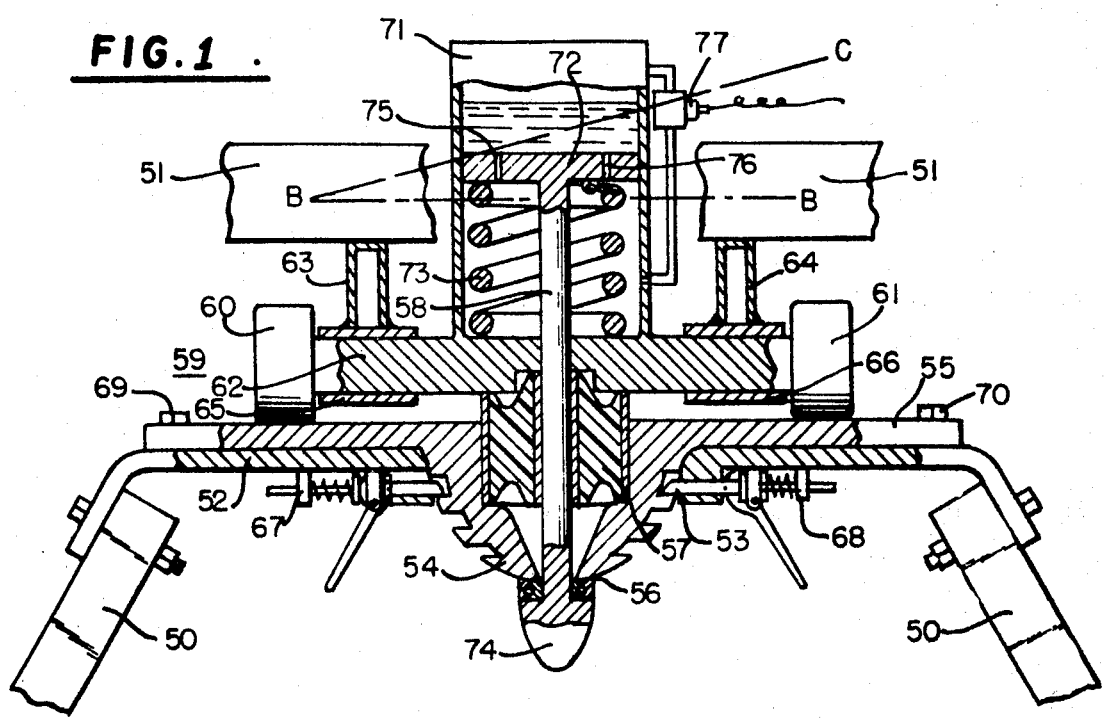
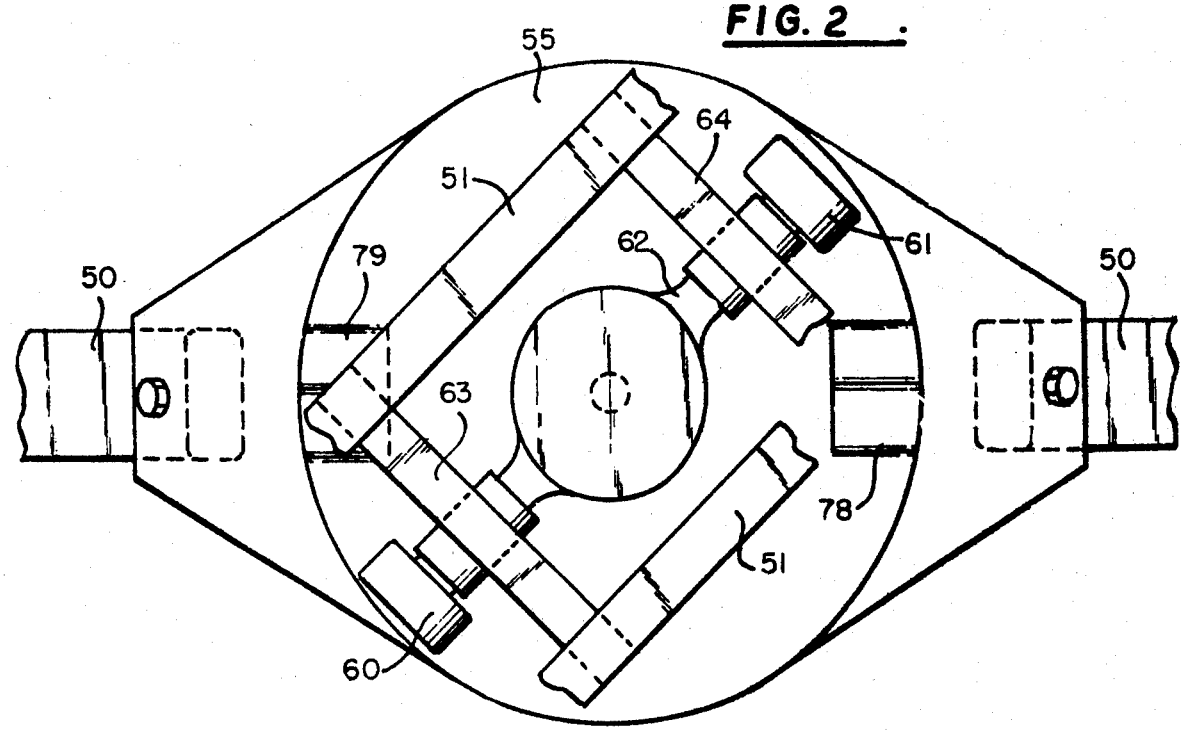

TRAILER COUPLING MEANS

This is a division, of application Ser. No. 198,378, filed Nov. 12, 1971 now U.S. Pat. No. 3,825,281.

BACKGROUND OF THE INVENTION

When a trailer is being towed by an automobile, there is often a tendency for the trailer to move about the yaw axis relative to the towing vehicle, thereby inposing substantial lateral forces upon the rear end of the vehicle. In severe cases, such as under strong wind conditions, the yaw effects may be considerable and may render the towing vehicle uncontrollable. It is also desirable to permit relative movement between the towing vehicle and the trailer and to cushion and damper vertically directed shock forces.

OBJECTS OF THE INVENTION:

It is an object of this invention to provide an anti-yaw roll and pitch control means which immeasurably add to the safety of the towing arrangement. Both yaw and roll control are applied in a towing arrangement.

It is another object of this invention to provide a speed-responsive anti-yaw control means which will prevent yaw and sway at high speeds but will permit yaw moment at low speeds.

BRIEF DESCRIPTION OF THE DRAWINGS

FIG. 1 is a cross-sectional view of the fifth wheel means used to couple a trailer to an automobile;

FIG. 2 is a partial plan view of the fifth wheel assembly used to couple the automobile and trailer together;

DESCRIPTION OF THE PREFERRED EMBODIMENTS

Figure 3:
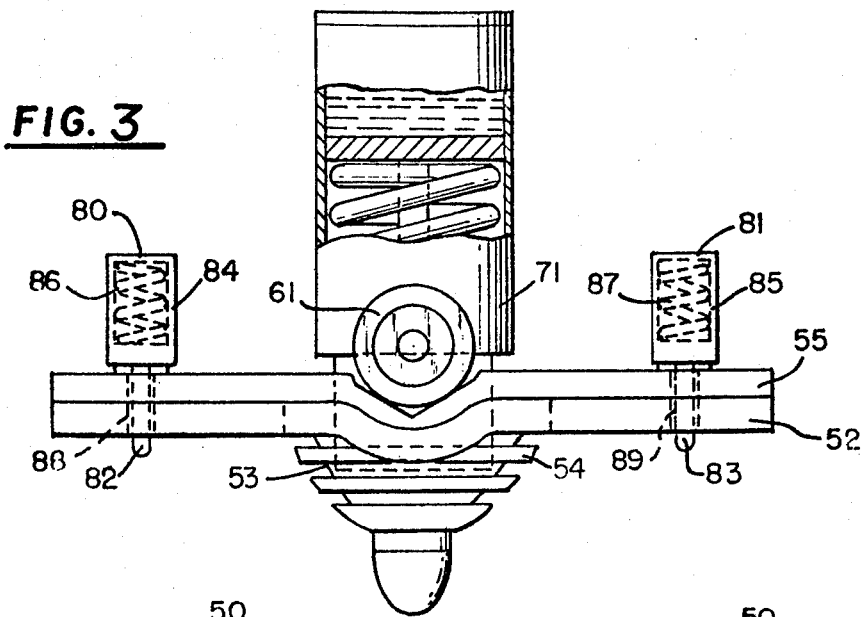
FIG. 3 is a side and partial cross-sectional view of an alternate form of the fifth wheel assembly used to couple the trailer to the automobile.

The fifth wheel assembly of this invention provides for roll, pitch, and yaw movement of the trailer with respect to the automobile. This fifth wheel coupling means is designed to connect the first frame means 50 or the demountable frame for the automobile to a second frame means 51, connected to the trailer, and provide for movement between the two. A first plate means 52 is securely mounted by means of bolts or welding to the first frame means 50 and provides a stable platform for the fifth wheel coupling device. The plate means 52 defines an aperture 53 which receives a protuberance 54 formed on the other side of a second plate means 55. The second plate means also defines aperture 56 and provides for a resilient mounting means 57 for a pivot pin 58. This pivot pin 58 also extends through the aperture 53 defined in plate 52 and forms the precise center of rotation for the fifth wheel assembly when compensating for yaw movements of the trailer.

The load of the trailer 51 is carried by a roller means 59 generally defined by rollers 60 and 61 and cross-bar 62. This cross-bar supports the channel members 63 and 64 which are mounted to the cross-bar by means of sleeves 65 and 66. The cross member 62 rotates about pivot pin 58 as the trailer varies its yaw angle.

In operation, the fifth wheel assembly, broadly generalized by numerals 54 through 66, is mounted on the trailer frame. The automobile is backed under the trailer until the aperture 53 defined by plate 52 is generally underneath the protuberance 54 defined on the underside of the fifth wheel device. The trailer is then lowered, and its plates 52 and 55 come together, the protuberance 54 gradually aligning the two plates by means of its general conical or hemispheroidal shape. After the plates have made contact, the locking means 67 and 68 grip the protuberance and hold the two plates in alignment. The plates are then secured by means of fasteners which are illustrated as bolts 69 and 70. The fifth wheel coupling device illustrated in FIG. 1 is also equipped with a shock absorber and resilient mounting to provide for roll movement of the vehicle with respect to the automobile and to provide for cushioning and dampening of vertically-transmitted shocks to the coupling members themselves.

Generally speaking, the load and any attendant shocks or variations in load are transmitted directly from frame 50 through sub-plates 52 and 55 to the roller means 59, and directly to the trailer frame 51. The downward component of the load is transmitted in the reverse order from frame 51 through channel 63, cross-member 62, rollers 60 and 61, plates 55 and 52, and the demountable frame assembly 50.

The shock-absorbing means generally designated as 71 has a plunger 72 mounted on the upper portion of pivot pin 58 and a spring-biasing member 73. This spring-biasing member 73 provides for a positive bias between the plate member 55 and the cross-member 62. As spring means 73 exerts its force upwardly, it transmits the upward component of this force through flange 72 to pivot pin 58. The force is then transmitted in two directions, one being through the resilient member 57, and the other through the end portion 74 of pivot pin 58 to the protuberance 54 and plate 55.

The adjustable biasing between the roller means 59 and plate means 55 is useful in two ways. First, it provides a positive bias for the roller detent combination to be described and illustrated with respect to FIG. 2. Secondly, it also assists in providing for the roll movement in the coupling means. Any sudden shifts in the roll axis of the trailer is countered in the fifth wheel coupling by means of the fluid contained in the shock absorber 71. Since the liquid is essentially incompressible, the liquid contained in the lower portion of 71 below flange 72 receives the shock and tends to maintain the roller means 59 and plate means 55 in a fixed relationship. This force is transmitted through pin 58. For gradual movements, however, the liquid is allowed to flow through the port openings 75 and 76 to the upper chamber of shock absorber 71. To illustrate, as the frame member 51 moves from axis BB to the axis defined by BC, the wheel 61 of roller means 59 will leave plate 55. The axis of pivot pin 58 will also move to the side as the flange 72 moves downwardly. The lateral movement of pivot pin 58 is absorbed by the shock-absorbing resilient means 57. This allows pivot pin 58 to move to left or right, depending upon the roll axis of the trailer. After the roll axis of the trailer has moved from BC back to its original position BB, the fluid is allowed to flow back through port 75 and port 76 as the roll axis is normalized. The check valve 77 prevents any sudden movement of the fluid to the upper chamber. A dump valve 77 is connected to the automobile to permit rapid passage of the fluid from the lower portion to the upper portion of chamber 71. Dump valve 77 is speed-responsive and is connected to the automobile for operation. In addition to normal operation or override, the valve will automatically open when the speed of the automobile drops below a predetermined level, as for example, ten miles per hour. If the operator is towing the trailer diagonally across the curve or other sharp gradient, the roll axis of the car will be different from the roll axis of the trailer, and the rate of change between the two will be quite rapid. Under normal circumstances, the shockabsorbing means 71 would provide that the trailer and car maintain a relatively rigid alignment. The speed-responsive nature of dump valve 77 will open valve 77 and allow for fairly rapid fluctuations in the roll axis between frame member 51 and frame member 50. After the operator has driven the vehicle and trailer over the curve or other problem area, the valve will close to again present the safety features noted above.

FIG. 2 illustrates a roller-detent mechanism for maintaining the automobile and trailer at a specific axial alignment. Plate member 55 is provided with a pair of detents 78 and 79. Spring member 73 biases the roller members 60 and 61 into the detents 78 and 79 when the trailer and the automobile are aligned. This tends to maintain the two in an axial alignment and tends to dampen small sharp changes in alignment due to gusts of wind, driver movements and the like. The spring means 73, and the incompressible liquid present in the shock-absorber 71 also tend to lock the rollers 60 and 61 into detent means 78 and 79. This provides an anti-sway protection since any sudden large movements of amplitude would require that rollers 60 and 61 move out of detent 78 and 79. These rollers are normally held into the detents by spring 73 and the incompressibility of the liquid below piston 72. As noted previously, the incompressible liquid would prevent any rapid movement of piston 72 but would allow any gradual changes due to normal highway curves. At slow speeds wherein the driver is backing or maneuvering the trailer, the speed-responsive nature of dump valve 77 will open, the valve thereby permitting the rollers 60 and 61 to move out of detent 78 and 79 as the driver executes his turn. This type of yaw control or anti-sway control is extremely useful when the trailer and automobile are buffeted by strong side or lateral wind forces or when the driver is attempting to brake on a steep hill, or when the driver is negotiating a passage over ice or other slippery road conditions.

Under normal circumstances, the weight of the trailer will be substantially greater than that of the car, and if the axis of movement deviates substantially from that of the car, the trailer will tend to slip around to the side of the automobile, thereby displacing and rolling both the trailer and the car. Alternately, the trailer in its sidewise movement will exert a sideward moment on the automobile which will tend to flip it, which in turn will result in the overturning of the trailer. The antisway control tends to maintain the two in a locked condition and allows the driver to compensate for any skid in the manner in which a conventional skid is compensated for. By turning the wheels of the automobile in the direction of the skid, the driver can to some extent prevent the trailer and automobile rig from going out of control.

The roller-detent mechanism may be sized to provide any amount of locking or anti-sway control desired. By varying the diameters of the roller 60 and 61, the relative dimensions of the detent 78 and 79, and the relative strength of the shockabsorber 71, the sway control may be made to cover a wide variety of loading conditions.

The fifth wheel coupling means also provides for free rolling pitch moment between the trailer and automobile. The pitch moment is absorbed as frame members 63 and 64 rotate about axle 62 by virtue of collars 65 and 66. The rotation of rollers 60 and 61 would also absorb pitch moment between the trailer and automobile.

Figure 4:
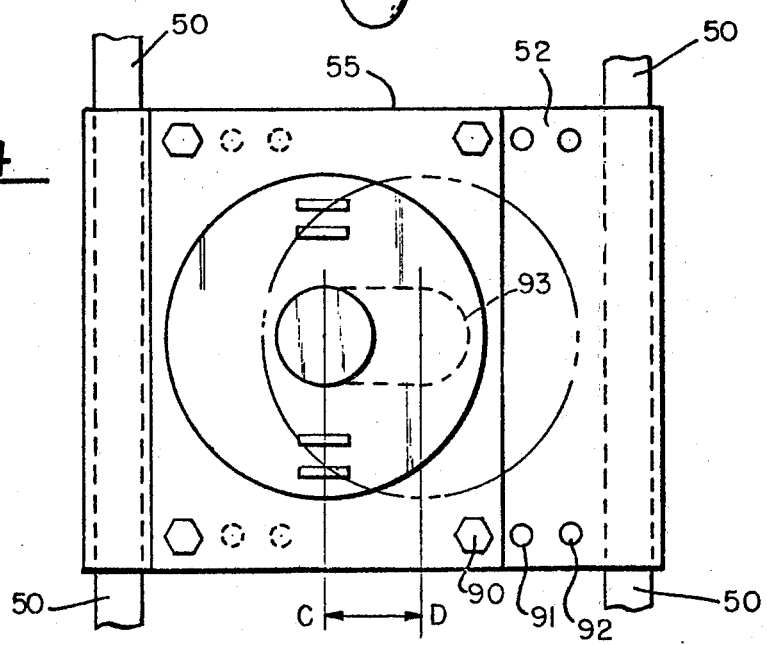
FIG. 4 is a top plan view of an alternate embodiment of the invention illustrating means to adjust the loading point of the trailer along the car's longitudinal axis.

FIG. 3 and FIG. 4 represent modifications of the fifth wheel assembly illustrated and previously described with respect to FIGS. 1 and 2. FIG. 3 illustrates an alternate selfaligning and locking mechanism for attaching the trailer to an automobile. As may be expected, providing the exact alignment for the locking means 69 and 70 may be somewhat difficult even though the protuberance 54 has aligned plates 55 and 52. Since there is a rotational alignment as well as axial alignment, it is necessary to ensure that the vehicle and the trailer are aligned perfectly before the locking means 69 and 70 are brought into proper alignment. In FIG. 7, the locking means 69 and 70 have been replaced by locking means 80 and 81. These locking means are securely mounted to plate 55 and provide spring-loaded plungers 82 and 83 which are normally partially recessed within the upper portion 84 and 85 of the spring-loaded self-aligning means.

In coupling the trailer to the automobile, the operator drives the vehicle under the trailer, as discussed previously with respect to FIG. 1. The trailer is then lowered conventional jack could be used as proturberance 54 slides through aperture 53 defined in plate 52. At this point, unless there is perfect alignment, the spring means 87 and 88 will be compressed, and the plungers 82 and 83 will be resting on the upper surface of plate 52. The driver then pulls away, towing the vehicle, and as the vehicle and the trailer come into alignment the plungers 82 and 83 will snap through the aperture 88, 89 defined in plate 52 and provide an automatic, spring-loaded self-aligning locking means.

FIG. 4 illustrates an alternate embodiment of the invention. In this embodiment, the operator of the vehicle can select any one of three positions for the center of weight distribution. If it is desired to shift the center of weight distribution forward, plate 55 then is moved to the extreme position illustrated by letter C. If, on the other hand, the driver wishes to shift the center of weight distribution as far rearward as possible, the center axis is shifted, as indicated by the numeral D. The protuberance 54 extends through an elongated slot-like aperture 93 defined in plate 52. This allows the plate to move through the entire range CD of longitudinal movement. The plates 55 and 52 are secured to one another at the three positions by bolts or other fasteners. For example, bolt 90 may be secured at its present location, or secured in aperture 91 or aperture 92.

It is understood that the present disclosure is for the purposes of illustration only, and this invention includes all modifications and equivalents which fall within the scope of the following appended claims:

I claim:
1. Fifth wheel coupling apparatus for joining a first towing vehicle to a second trailer vehicle comprising:
    turntable means on one of said first and second vehicles,
    rotating means on the other of said first and second vehicles moving relative to said turntable means as said first and second vehicles turn relative to each other about both their yaw and roll axes, turning resistance means for providing a variably controllable resistance to turning of said first vehicle relative to said second vehicle about at least one of their roll and yaw axes, and vehicle speed responsive means for varying the resistance to turning provided by said turning resistance means in accordance with the speed of the joined vehicles.

2. The coupling apparatus of claim 1 wherein said turntable means is supported on said first vehicle and said rotating means is connected to said second vehicle and comprises an elongate member supporting a pair of spaced rollers which roll over a surface on said turntable means.

3. The coupling apparatus of claim 2 in which said turning resistance means includes spring means urging said rollers against said plane surface, said plane surface having at least one recess therein for receiving a respective one of said rollers.

4. The coupling apparatus of claim 3 in which said turning resistance means includes a piston slidable in a cylinder to control the application of force by said spring means.

5. The coupling apparatus of claim 4 in which said turning resistance means includes a by-pass valve controlling the flow of fluid in said cylinder from one side of the piston to the other side thereof.

6. The coupling apparatus of claim 4 in which said piston comprises a pivot means which passes through an aperture in said turntable means, and a resilient bushing in said aperture to permit rocking movement of said pivot means relative to the plane surface of said turntable means.

* * * * *